Patented May 14, 1946

2,400,195

UNITED STATES PATENT OFFICE 2,400,195

VAT DYESTUFFS

Maurice H. Fleysher, Buffalo, N. Y., assignor to Allied Chemical & Dye Corporation, New York, N. Y., a corporation of New York No Drawing. Application November 15, 1941, Serial No. 419,353

10 Claims. (Cl. 260—354)

This invention relates to improved isodibenzanthrone vat dyestuffs dyeing cellulose fibers gray to black shades and to a process of producing them. It relates more particularly to an improved vat dyestuff which is an oxidation product of an aminoisodibenzanthrone and to a process of preparing said dyestuff.

An object of the present invention is to provide vat dyestuffs which are capable of producing gray to black shades on vegetable fibers by the usual dyeing and printing processes which dyeings and printings are fast to light, washing, water-spotting, chlorine (e. g., aqueous alkaline hypochlorite) and to solutions in oxygen-containing organic solvents of cellulose acetate and resins of the type employed in the so-called "Trubenizing" and "collar fusing" processes of crease-proofing and stiffening fabrics.

Another object of the invention is to provide a vat dyestuff which dyes cellulose fibers by the usual dyeing and printing processes reddish-gray to reddish-black shades that are fast to light, washing, water-spotting, aqueous alkaline hypochlorite, and acetone solutions of cellulose acetate.

Other objects of the invention in part will be obvious and in part will appear hereinafter.

According to the present invention, vat dyestuffs which dye cotton gray to black shades when applied by dyeing and printing processes are obtained by reacting an amino-isodibenzathrone (an amino-isoviolanthrone) with nitrous acid under acidic oxidizing conditions (e. g., in the presence of mineral acid at temperatures above diazotization temperatures). It has been found in accordance with the present invention that the vat dyestuff obtained in this manner is an oxidation product of the amino-isodibenzathrone, containing 2 to 3 per cent of nitrogen in a form other than amino-nitrogen and having desirable fastness properties. Thus, it has been found in accordance with the present invention, when an amino-isodibenzanthrone, and especially the crude mixture of monoamino- and diamino-isodibenzanthrones containing about 4 per cent of nitrogen and resulting from the reaction of the crude mixture of nitro-isodibenzanthrones obtained by nitration of the crude isodibenzanthrone product (Color Index No. 1103) resulting from the fusion of Bz1-chlorbenzanthrone with alcoholic caustic potash, is reacted with nitrous acid under acidic oxidizing conditions, a vat dyestuff is obtained having a number of advantageous properties which adapt it for general use as a vat dyestuff for producing gray to black dyeings on cellulose fibers, such as cotton and viscose rayon, by the usual dyeing and printing processes. For example, the dyestuff when applied to cotton or viscose rayon in the conventional manner from an alkaline hydrosulfite vat followed by atmospheric oxidation, or by the usual printing processes, produces dyeings and prints of characteristic gray to black shades which usually have a desirable reddish cast and which are further characterized by excellent fastness properties, being fast to light, washing, water-spotting, chlorine (e. g., aqueous alkaline hypochlorite), and to the low-boiling oxygen-containing organic solvents (such as acetone, alcohol and ether) and/or cellulose acetate, resins, and solutions thereof in such low-boiling solvents, which are usually employed in the so-called "Trubenizing" and "collar fusing" processes of crease-proofing or stiffening fabrics. The latter property is of particular importance inasmuch as many of the vat dyestuffs heretofore used for producing black dyeings and prints on cellulose fibers are not fast to the solvents and compositions generally employed in the 'Trubenizing" and "collar fusing" processes.

This result is surprising inasmuch as the products resulting from the oxidation of the same amino-isodibenzanthrones with the usual oxidizing agents (such as chromic acid, or sodium chlorate in the presence of sulfuric acid) give dyeings and prints which are substantially less fast to washing and to alkali, and which bleed perceptibly when treated with low-boiling organic solvents such as are employed in "Trubenizing" or "collar fusing." Further, the products obtained by the oxidation of amino-dibenzanthrones with any of said oxidizing agents (including nitrous acid under acidic oxidizing conditions) also do not have the valuable properties of the dyestuffs obtained in accordance with the present invention.

The dyeings and prints of the vat dyestuffs of the present invention have the further advantages that they can be reduced with alkaline hydrosulfite and then reoxidized in the air on the fiber without substantial loss of color value or change in the finally oxidized shade, and that they can be employed in admixture with small amounts of shading colors, such as Carbanthrene Golden Orange G (Color Index 1096) or the bluegreen vat dyestuff resulting from the reaction of sulfur with nitro-methyl-benzanthrone, without loss of their valuable fastness properties.

While it is known that the dyestuffs of the present invention contain 2 to 3 per cent by weight of nitrogen, which is present in a form other than amino-nitrogen, the exact chemical composition of the dyestuffs is not known.

In the practice of the present invention in accordance with a preferred method of procedure, an amino-isodibenzanthrone, preferably in a finely-divided form such as is produced by acid pasting (e. g., by precipitating the amino-isodibenzanthrone from a solution thereof in concentrated sulfuric acid by dilution with water), is reacted in suspension in dilute sulfuric acid with nitrous acid while warming gently. A convenient method for effecting the reaction is to suspend the finely-divided amino-isodibenzanthrone in water, add sufficient sulfuric acid to assure acidity of the mixture to Congo red throughout the treatment with nitrous acid, warm the acid mixture gently, and then add sodium nitrite or other suitable nitrous acid salt to the resulting warm acid suspension. The warm acid mixture is stirred for some time and the oxidation reaction is completed by boiling the mixture, preferably for a sufficient time to expel oxides of nitrogen resulting from the decomposition of nitrous acid and other gaseous products of the oxidation reaction. Thereafter the mixture is cooled, and the resulting dyestuff is separated in the form of a press-cake from the remaining acid solution by filtration. The press-cake is then worked up into the usual dyestuff pastes and/or flakes, powders, grains, or the like, with or without the addition of usual diluents, assistants and the like in the manner customary in the art.

The invention will be further described in connection with the following specific example which serves to illustrate the invention and in which a crude amino-isodibenzanthrone product is subjected to the oxidation process forming a part of the present invention. The crude amino-isodibenzanthrone product is obtained by reducing, preferably by means of aqueous sodium sulfide, a crude nitro-isodibenzanthrone product resulting from the nitration (for example, by means of 50 per cent nitric acid in an aqueous medium, or concentrated nitric acid in an organic solvent medium) of a crude isodibenzanthrone produced by fusing Bz1-chlorbenzanthrone was alcoholic caustic potash. The crude isodibenzanthrone, which contains chiefly isodibenzanthrone, not more than 5 per cent of dibenzanthrone and some non-vattable organic matter, is converted by the nitration to a mixture which is almost completely vattable and contains chiefly nitro-isodibenzanthrones and lesser quantities of other products which are probably nitro products derived from the compounds associated with the isodibenzanthrone. The nitration is carried out until the nitrogen content of the resulting crude nitroisodibenzanthrone product is between 2.8 and 5.1 per cent by weight, which corresponds with a nitration product containing a mixture of mononitro- and dinitro - isodibenzanthrones. The amino-isodibenzanthrone product resulting from the reduction of the nitro-isodibenzanthrone product contains about 4 per cent of nitrogen by weight, which corresponds with a mixture of amino organic compounds containing monoamino- and diamino-isodibenzanthrones as the major constituents. Parts, in the example, are by weight.

*Example*

A crude amino-isodibenzanthrone of the type above described is acid-pasted by dissolving 440 parts thereof in 4400 parts of 100 per cent sulfuric acid at 20° to 25° C., and running the solution into 8000 parts of water at such a rate that the temperature of the mass is maintained below 40° C. The mixture is diluted with 3200 parts of water and filtered and the press-cake is washed acid-free.

The resulting press-cake of acid-pasted amino-isodibenzanthrone product is slurried in 5000 parts of water; to the slurry, 720 parts of 100 per cent sulfuric acid are added; the aqueous mass is warmed to 40° to 50° C.; and then an aqueous solution of 190 parts of sodium nitrite in 380 parts of water is added. The mixture is agitated for 18 hours at 40° to 50° C., and to complete the oxidation and to expel gaseous products of the oxidation and oxides of nitrogen, the slurry is heated to its boiling point and maintained boiling for about 1 hour. The batch is then cooled to about 30° C. by addition of cold water, and filtered. The press-cake, which contains the oxidized amino-isodibenzanthrone vat dyestuff, is washed with cold water until acid-free.

The dyestuff thus obtained contains 2 to 3 per cent, usually about 2.5 per cent of nitrogen. It is not reducible by sodium sulfite. It dissolves in 100 per cent sulfuric acid to form a greenish-black solution, and in pyridine and nitrobenzene to form red solutions which show a strong orange fluorescence. From a blue-violet vat it dyes cotton and viscose rayon in bright reddish-gray to reddish-black shades that are fast to light, washing, water-spotting, aqueous alkaline hypochlorite, and to the low-boiling oxygen-containing solvents and other compositions used in "Trubenizing" or in "collar fusing."

The press-cake can be treated by the usual standardization procedures to bring it to a uniform paste or dry powder, or the like, of desired color value. If desired, other vat dyestuffs which possess similar fastness properties may be incorporated into said paste, powder and the like compositions in small amounts to modify the shade of the dyeings and prints obtained with the dyestuff. For example, a dyestuff paste particularly useful for printing cellulose fibers gray to black shades can be produced by mixing 0.6 part of a dispersing agent, such as the formaldehyde condensation product of beta-naphthalene sulfonic acid, and 0.5 part of alkali (e. g., sodium hydroxide) with 340 parts of a press-cake of the above type containing 22.5 per cent of organic solids, adding 205 parts of diethylene glycol, 53 parts of a paste of the vat dyestuff resulting from the reaction of sulfur with nitro-methyl-dibenzanthrone and 45.3 parts of a paste of Carbanthrene Golden Orange G (Color Index 1096) and evaporating the mixture to a composition having the following constitution:

| | Per cent |
|---|---|
| Oxidized amino-isodibenzanthrones | 18.3 |
| Sulfurized nitro-methyl-dibenzanthrone | 2.2 |
| Carbanthrene Golden Orange G | 1.9 |
| Dispersing agent | 0.3 |
| Diethylene glycol | 52.5 |
| Water | 24.8 |

It will be realized by those skilled in the art that the invention is not limited to the details of the above specific example and that changes can be made without departing from the scope of the invention.

Thus, the invention is not limited to the treatment of the crude amino-isodibenzanthrone above disclosed, but includes the treatment of various amino-isodibenzanthrones containing one or more amino (NH₂) groups and mixtures thereof. The amino-isodibenzanthrones may be free from further substituents or may be further substituted, as for example by one or more members of the group consisting of halogen atoms and alkyl and alkoxy radicals. Additional specific examples of such amino-isodibenzanthrones are: amino - methoxy - isodibenzanthrone, amino - methyl - isodibenzanthrone, Bz2 - Bz2'-diamino-isodibenzanthrone, Bz3-Bz3'-diamino-isodibenzanthrone, dichlor - mono - amino - isodibenzanthrone, dibrom-mono-amino-isodibenzanthrone, dichlor-diamino-isodibenzanthrone, dibrom - diamino-isodibenzanthrone, etc.

For purposes of the present invention, the acidic oxidizing conditions involve the use, as the suspension medium for the amino-isodibenzanthrone, of an aqueous non-oxidizing mineral acid of such concentration that the amino-isodibenzanthrone and the resulting oxidation product are substantially insoluble therein (examples of such acid solutions being: hydrochloric acid and aqueous sulfuric acid containing not more than 70 per cent sulfuric acid monohydrate) and maintenance of the mass during the reaction period, and especially during the addition of nitrous acid thereto, at a temperature of about 25° C. or higher but below a temperature at which the nitrous acid is decomposed rapidly, and before it can effect oxidation, into gaseous nitrogen oxides which are expelled from the reaction mixture. When the nitrous acid is formed in situ by adding a salt of nitrous acid to the suspension of the amino-isodibenzanthrone in the mineral acid, a sufficient amount of non-oxidizing mineral acid is required to be present during the addition period to liberate nitrous acid from the nitrous acid salt and to maintain the reaction mixture strongly acid to Congo red.

The tone of the gray to black dyeings and prints produced by the dyestuffs of the present invention can be varied from greenish to reddish by control of the content of amino nitrogen present in the amino-isodibenzanthrone subjected to the treatment, which in turn can be controlled by the extent of nitration to which the isodibenzanthrone is subjected. In general a greater content of nitrogen introduced by the nitration will result in a greener shade of the dyeings and prints produced by the oxidized amino-isodibenzanthrone.

Variations in the conditions in the oxidation step will produce an effect upon the brightness of the dyeings and prints obtained. In general the more vigorous the oxidizing conditions the greater will be the tendency to cause dullness of the dyeings and prints, and to make them appear more jet. Under otherwise like conditions and when the major portion of the oxidation is effected at moderate temperatures (as, for example, from about 25° C. to about 60° C.), it is preferable to use from about 3 to about 6 mols of nitrous acid for each mol of amino-isodibenzanthrone compound subjected to the oxidation treatment. The use of a proportion of nitrous acid in excess of the preferred upper limit results in an oxidation product imparting shades of gray and jet black which are somewhat dull, but not substantially different in other respects from products prepared according to the illustrative example. The use of a lesser proportion of nitrous acid than the preferred lower limit results in an oxidation product which, in comparison with the product made by the preferred method, imparts brighter shades of gray and jet black but is more or less lacking in other desirable properties, such as fastness to Trubenizing and "collar fusing," water spotting, chlorine and washing. Modifications of the process of the example wherein the temperature of the oxidation reaction mass is maintained materially above 60° C. result in dyestuffs which impart duller gray and jet black shades, although the fastness qualities of these shades are not changed. When the temperature maintained during the oxidation period is adjusted at levels materially above 60° C., and the same degree of oxidation is desired, the proportion of nitrous acid in relation to the amino-isodibenzanthrone compound must be increased to off-set the loss of nitrous acid by decomposition, induced and accelerated by heat, to form nitrogen oxides which escape in gaseous form from the reaction mass. Thus, while the reaction could be conducted wholly at the boiling point of the slurry, the oxidation would require an inordinate addition of nitrite and acid to off-set the rapid decomposition and loss of nitrous acid in the hot reaction mass.

In the preparation of the paste above specifically described, other high-boiling hygroscopic liquids having assisting action in printing can be employed instead of diethylene glycol; as, for example, glycerine, ethylene glycol, and the like substances usually employed in such compositions.

Since changes may be made in carrying out the invention without departing from its scope, it is intended that all matter contained in the above description shall be interpreted as illustrative and not in a limiting sense, except as limited by the appended patent claims.

I claim:

1. An isodibenzanthrone vat dyestuff which is an oxidation product of an amino-isodibenzanthrone, which dyestuff has been obtained by reacting an amino-isodibenzanthrone with nitrous acid under acidic oxidizing conditions.

2. An isodibenzanthrone vat dyestuff which is an oxidation product of an amino-isodibenzanthrone, which dyestuff has been obtained by reacting a mixture of monoamino-isodibenzanthrone and diamino-isodibenzanthrone with nitrous acid under acidic oxidizing conditions.

3. A process of making a vat dyestuff which comprises reacting nitrous acid under acidic oxidizing conditions, an amino-isodibenzanthrone suspended in an aqueous non-oxidizing mineral acid, the amount of nitrous acid being sufficient to produce a dyestuff dyeing cellulose fibers from a hydrosulfite vat gray to black shades that are fast to light, washing, water-spotting, aqueous alkaline hypochlorite, and to low-boiling oxygen-containing organic solvents.

4. A process of making a vat dyestuff which comprises reacting nitrous acid under acidic oxidizing conditions with a mixture of monoamino- and diamino-isodibenzanthrones suspended in an aqueous non-oxidizing mineral acid, the amount of nitrous acid being at least 3 mols per mol of amino-isodibenzanthrone.

5. A process of making a vat dyestuff which comprises reacting nitrous acid under acidic oxidizing conditions including a temperature of at least 25° C., with a sulfuric acid suspension of a crude mixture of monoamino- and diamino-isodibenzanthrones resulting from the reduction of a mixture of nitro-isodibenzanthrones having a nitrogen content of 2.8 to 5.1 per cent which has been produced by nitrating with nitric acid the crude isodibenzanthrone product resulting from the fusion of Bz1-chlorbenzanthrone with alcoholic caustic potash, the amount of nitrous acid being at least 3 mols per mol of amino-isodibenzanthrone.

6. A process of making a vat dyestuff which comprises adding an alkali metal nitrite to an aqueous solution of sulfuric acid which has suspended therein a crude mixture of monoamino- and diamino-isodibenzanthrones and which is at a temperature of at least 25° C. but below the temperature at which nitrous acid is decomposed rapidly, the amount of alkali metal nitrite being about 3 to about 6 mols per mol of amino-isodibenzanthrone and the amount of sulfuric acid being sufficient to maintain the reaction mixture strongly acid to Congo red, and maintaining the temperature of the resulting mixture at 40° to 50° C. to produce oxidation of the amino-isodibenzanthrones to a vat dyestuff.

7. A process of making a vat dyestuff which comprises adding sodium nitrite to a suspension of a crude mixture of amino compounds containing monoamino- and diamino-isodibenzanthrones and having a nitrogen content of about 4 per cent in an aqueous solution of sulfuric acid, which suspension is at a temperature of at least 25° C. but below the temperature at which nitrous acid is decomposed rapidly, the amount of sodium nitrite being about 3 to about 6 mols per mol of amino-isodibenzanthrone and the amount of sulfuric acid being sufficient to maintain the reaction mixture strongly acid to Congo red, and maintaining the temperature of the resulting mixture at 40° to 50° C. for about 18 hours to produce oxidation of the amino-isodibenzanthrones to a vat dyestuff, said crude mixture of amino compounds having been obtained by reducing a mixture of nitro-isodibenzanthrones which has been produced by nitrating with nitric acid the crude isodibenzanthrone product resulting from the fusion of Bz1-chlorbenzanthrone with alcoholic caustic potash.

8. An oxidized amino-isodibenzanthrone vat dyestuff obtained by reacting nitrous acid under acidic oxidizing conditions with a crude mixture of monoamino- and diamino-isodibenzanthrones resulting from the reduction of a mixture of mononitro- and dinitro-isodibenzanthrones which has been produced by nitrating with nitric acid the crude isodibenzanthrone product resulting from the fusion of Bz1-chlorbenzanthrone with alcoholic caustic potash.

9. An oxidized amino-isodibenzanthrone vat dyestuff obtained by the process of claim 4.

10. An oxidized amino-isodibenzanthrone vat dyestuff obtained by the process of claim 6.

MAURICE H. FLEYSHER.